3,342,602
NON-SILVER PHOTOSENSITIVE PRINTOUT
COMPOSITIONS
Robert H. Sprague, Chagrin Falls, John A. Stewart, Parma, and James M. Lewis, Cleveland, Ohio, assignors to Horizons Incorporated, a corporation of New Jersey
No Drawing. Filed Sept. 21, 1964, Ser. No. 398,097
9 Claims. (Cl. 96—90)

ABSTRACT OF THE DISCLOSURE

Non-silver photosensitive compositions containing a colorless leuco-compound, the color formation of which, on exposure to visible light, is enhanced by the presence of both (a) a halogen substituted organic compound and (b) a sulfur containing organic compound, admixed with said leuco-compound.

---

This invention relates to non-silver photosensitive compositions which print-out an image directly upon exposure to a suitable dosage of visible light, and to the use of such compositions as thin films in photographic processes.

More particularly, this invention relates to photosensitive compositions comprising at least one colorless leuco compound which when intimately admixed with at least two types of activator compounds yields a mixture which when exposed to visible light prints out a visible image directly at speeds which are of practical significance, and to the processing of such compositions to yield a permanent useful image.

The present invention comprises certain improvements over the inventions described in United States patent application Ser. No. 270,551 filed Apr. 4, 1963, which issued as United States Patent 3,285,744 on Nov. 15, 1966, the disclosure of which is incorporated herein by reference.

Briefly the compositions of the instant invention differ from those in the aforesaid patent in that the compounds utilized in activating the colorless leuco compound comprise a synergistic combination of activators consisting of the sulfur containing activators described in that patent together with at least one activator from an entirely different class of organic compounds. As a result of the use of this composite activator, an unexpectedly higher maximum density is obtained and a tendency toward reciprocity failure exhibited by the compositions described in the above-noted application are overcome.

It has been further found that the addition of trace amounts of cyanine dyes of specified types to compositions containing the synergistic combination of activators gives a more precise control of spectral sensitivity and in some instances gives increased speed as compared with otherwise similar compositions from which cyanine dyes have been omitted.

These and other aspects of the invention will become more apparent from the description which follows in which each of the components of the photosensitive compositions of this invention will be described in greater detail.

(1) The leuco compounds

The leuco compounds which may be utilized in accordance with the invention described in United States Patent 3,285,744 and with the present invention comprise two recognized classes of dye forming colorless compounds, namely certain kinds of leuco triarylmethane dyes and a second class of leuco compounds, including leuco xanthenes, leuco thioxanthenes and leuco anthracenes.

The leuco bases of triarylmethane dyes which are suitable in the composition about to be described more fully are those represented by the general formula

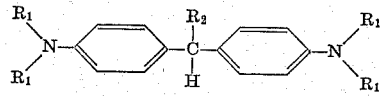

wherein each $R_1$ is selected from the group consisting of H, lower alkyl and aryl and the several R's may be the same or different, and $R_2$ is selected from the group consisting of H, aryl, alkyl and particularly

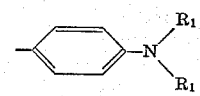

wherein each $R_1$ is selected from the group consisting of H, alkyl, and aryl.

Leuco dyes represented by the above formula which have been found suitable include:

leuco crystal violet
leuco opal blue
leuco malachite green
leuco rosaniline
leuco pararosaniline
p,p′,p″-trimethyl leuco opal blue
p,p′,p″-trichloro leuco opal blue
p,p′-bis-tetramethyl-diaminodiphenyl methane and other compounds of a similar nature.

The second class of leuco compounds which are suitable in the composition about to be described more fully, are generally similar to the leuco triarylmethane dyes except that they are characterized by the presence of one or more hetero atoms bridging the two anilino rings and therefore are compounds which may be represented by the general formulas

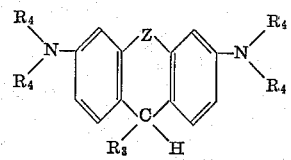

and

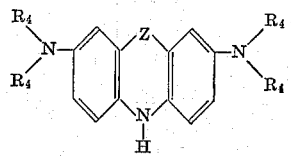

wherein each $R_4$ is selected from the group consisting of H, lower alkyl and aryl and may be the same or different and $R_3$ is selected from the group consisting of H, alkyl and aryl, including particularly

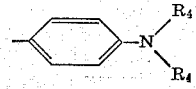

wherein $R_4$ means H, lower alkyl or aryl; and wherein Z represents a member selected from the group consisting of $>O$, $>S$, $>Se$, $>NH$, and

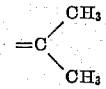

The preferred leuco compounds of this class are substituted in the 3,6 positions and include 3,6 bis (dimethylamino)-9-(p-dimethylaminophenyl) xanthene 3,6 bis (diethylamino)-9-(p-dimethylaminophenyl) xanthene 3,6 bis (diethylamino)-9-(p-diethylaminophenyl) xanthene 3,6 bis (dimethylamino)-9-(p-dimethylaminophenyl) thioxanthene 2,7-bis (dimethylamino)-10-p-dimethylaminophenyl-9, 10-dihydro-9,9-dimethylanthracene

(2) The activators

The activators useful in the present invention comprise the simultaneous use of the colorless nontoxic sulfur containing organic compounds disclosed in the above noted United States patent and of the free radical producing organic halogen compounds such as those represented by the formula A—C—$X_3$ wherein A represents a member of the group selected from alkyl, aryl, aroyl, aralkyl, H, haloalkyl, Cl and Br and each X is Cl or Br.

The first group of activators include the following sulfur containing organic compounds:

(1) Mercapto compounds of the type R—SH wherein R is a heterocyclic nucleus of the type commonly used in cyanine dye chemistry (as in the above noted patent);

(2) Disulfides of the type R—S—S—R wherein R has the same meaning as in 1 above;

(3) Disulfides of the general formula

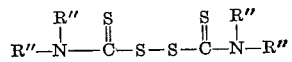

wherein R″ is selected from the group consisting of H, lower alkyl and aryl;

(4) Cyclic sulfur compounds wherein the sulfur is attached to a carbon atom in a heterocyclic ring wherein the same carbon atom is attached to two non-carbon atoms e.g. as in rhodanine or tetrazole; and (5) Thiourea and substituted thioureas; and (6) Acyclic thioacetanilides.

The second member of the composite activator is a halogen compound represented by the formula R—C—$X_3$ wherein X is Cl or Br and both Cl and Br may be present in the compound and R is alkyl, aryl, aroyl, H, Cl, Br, haloalkyl and aralkyl.

The preferred activator consist of 2-mercaptobenzothiazole and carbon tetrabromide.

The data reported in Table I which follows is the result of tests establishing the effect of visible light on mixtures containing carbon tetrabromide or 2-mercaptobenzothiazole individually as the activator compounds used with the indicated leuco bases and on mixtures in which both carbon tetrabromide and 2-mercaptobenzothiazole were used to activate the indicated leuco bases.

To obtain the data, a binder mixture was prepared consisting of equal parts by volume of acetone and a 10% solution of polystyrene in benzene when the binder used was polystyrene, 2 cc. of each being used; when the binder was cellulose acetate butyrate the binder solution was formulated by mixing equal parts by volume of benzene and a 10% solution of the binder in acetone. Then the indicated weights of the leuco compound and of the activator were dissolved in the binder mixture. The resulting composition formed from originally colorless materials usually had a cloudy or hazy appearance or a faint pinkish color. The composition was coated by means of a Bird Applicator on Mylar polyethylene terephthalate (300–D or 302–T) in a coating having an 0.0015 inch or 0.003 inch wet thickness and the coating was permitted to dry in air. Thereafter the compostion was exposed to a photoflood lamp for 1 minute through a step tablet or with superimposed red, green and blue filters. The number of steps visible and the difference between D-max. and the density of the base plus fog are an indication of the photographic response of the composition.

TABLE I.—ACTIVITY OF VARIOUS LEUCO COMPOUNDS IN CBr₄/MBT FORMULA

| Formula No. | Leuco Compound | Mg. | Activator (mg.) CBr₄ | Activator (mg.) 2-MBT | Wet Coating Thickness (inch) | Binder | Base plus Fog | Clear No. Steps | Clear D.-max. | Red No. Steps | Red D.-max. | Green No. Steps | Green D.-max. | Blue No. Steps | Blue D.-max. | Image Color |
|---|---|---|---|---|---|---|---|---|---|---|---|---|---|---|---|---|
| 1 | Leuco Crystal Violet | 100 | 700 | | 0.003 | CAB | 0.10 | 18 | 3+ | 6 | 1.15 | 7 | 0.42 | 11 | 0.50 | Blue. |
| 2 | do | 100 | | 100 | 0.0015 | PS | 0.10 | 21 | 1.71 | 16 | 1.20 | 12 | 0.89 | 2 | 0.15 | Do. |
| 3 | do | 100 | 700 | 25 | 0.003 | CAB | 0.10 | 16 | 2.31 | 6 | 0.89 | 6 | 0.29 | 9 | 0.21 | Do. |
| 4 | 3,6-bis(dimethylamino)-9-p-dimethylaminophenyl-xanthene. | 100 | 700 | | 0.0015 | PS | 1.25 | 21 | 2.01 | 12 | 2.39 | 11 | 2.25 | 8 | 2.26 | Magenta. |
| 5 | As in 4 above | 100 | | 100 | 0.0005 | PS | 0.17 | 21 | 1.95 | 19 | 1.75 | 21 | 1.65 | 13 | 1.40 | Do. |
| 6 | do | 100 | 700 | 25 | 0.0015 | PS | 0.26 | 21 | 3+ | 18 | 2.81 | 21 | 2.36 | 17 | 2.20 | Do. |
| 7 | 3,6-bis(diethylamino)-9-p-dimethylaminophenyl-xanthene. | 100 | 700 | | 0.0015 | PS | 0.75 | 21 | 3+ | 14 | 2.96 | 21 | 2.04 | 9 | 2.95 | Purple. |
| 8 | As in 7 above | 100 | | 100 | 0.0015 | PS | 0.29 | 21 | 1.70 | 21 | 1.26 | 21 | 1.21 | 15 | 1.02 | Magenta. |
| 9 | do | 100 | 700 | 25 | 0.0015 | PS | 0.10 | 21 | 1.80 | 14 | 3+ | 19 | 1.80 | 17 | 2.87 | Purple. |
| 10 | 3,6-bis(dimethylamino)-9-p-dimethylaminophenyl-thioxanthene. | 25 | 700 | | 0.0015 | PS | 0.20 | 17 | 0.83 | 5 | 0.55 | 6 | 0.69 | 8 | 0.35 | Do. |
| 11 | As in 10 above | 100 | | 100 | 0.0015 | PS | 0.10 | 21 | 1.88 | 15 | 1.60 | 13 | 1.41 | 6 | 0.45 | Do. |
| 12 | do | 100 | 700 | 25 | 0.003 | CAB | 0.24 | 21 | 2.89 | 7 | 1.15 | 10 | 1.34 | 8 | 0.50 | Do. |
| 13 | 2,6-bis(dimethylamino)-selenoxanthene. | 100 | | 100 | 0.0015 | PS | 0.15 | 21 | 0.60 | 21 | 0.58 | 21 | 0.56 | 11 | 0.53 | Magenta. |
| 14 | As in 13 above | 100 | 700 | | 0.0015 | PS | 0.06 | 19 | 0.46 | 11 | 0.35 | 11 | 0.31 | 9 | 0.26 | Brown. |
| 15 | do | 100 | 700 | 25 | 0.003 | CAB | 0.20 | 18 | 2.64 | 10 | 1.62 | 10 | 0.90 | 7 | 0.55 | Magenta. |
| 16 | 3,6-bis(dimethylamino)-9-cyanoseleno-xanthene. | 100 | | 100 | 0.0015 | PS | 0.12 | 16 | 0.47 | 11 | 0.46 | 5 | 0.26 | 1 | 0.19 | Blue. |
| 17 | As in 16 above | 25 | 700 | | 0.003 | CAB | 0.14 | 15 | 0.95 | 12 | 0.94 | 3 | 0.20 | 4 | 0.20 | Purple. |
| 18 | do | 100 | 700 | 25 | 0.003 | CAB | 0.14 | 10 | 1.25 | 9 | 0.95 | 2 | 0.23 | 2 | 0.25 | Do. |
| 19 | As in 4 above | 100 | 700 | 25 | 0.0015 | PS | 0.10 | 21 | 2.59 | 11 | 2.65 | 20 | 1.74 | 13 | 2.05 | Magenta. |
| 20 | As in 4 above—Thioacetanilide replacing 2-MBT. | 100 | 700 | 25 | 0.0015 | PS | 0.14 | 21 | 2.26 | 14 | 2.11 | 18 | 1.76 | 15 | 1.30 | Do. |
| 21 | As in 4 above—Rhodanine replacing 2-MBT. | 100 | 700 | 25 | 0.0015 | PS | 0.46 | 21 | 3+ | 18 | 3+ | 21 | 2.31 | 10 | 1.84 | Do. |
| 22 | As in 4 above—Thiourea replacing 2-MBT. | 100 | 700 | 25 | 0.0015 | PS | 0.27 | 21 | 3+ | 17 | 2.75 | 21 | 2.31 | 18 | 2.15 | Do. |
| 23 | As in 4 above—Tetraethyl-thiuram disulfide replacing 2-MBT. | 100 | 700 | 25 | 0.0015 | PS | 0.20 | 21 | 2.16 | 13 | 1.61 | 18 | 1.42 | 10 | 0.69 | Do. |

The data reported in Table II shows the effect of very small amounts of added dyes to compositions of the type previously described. The data illustrate the spectral sensitization of the compositions, with consequent control of spectral response, as a result of the addition of very small amounts of a wide variety of dyes to compositions consisting of: (1) a leuco compound of the type indicated, and (2) an activator consisting of both carbon tetrabromide and 2-mercaptobenzothiazole; the dyes including xanthene dyes, cyanine dyes, carbocyanine dyes, thiacarbocyanine dyes, styryl quinolines and the like.

The manner in which the compositions were prepared and exposed was identical with that described for Table I except for the addition of the sensitizing dye.

*Proportions*

Preferred proportions of the several constituents are shown in Tables I and II. A useful range of proportions comprises from 1 to 100 parts of halogen containing activator per part of leuco compound by weight; from 0.1 to 10 parts of mercaptan activator per part of leuco compound by weight and when it is present, from 0.001 to 0.02 part by weight of added sensitizer dye per part of leuco compound.

The results in Table I show that use of both the halogen containing activator and the sulfur containing activator results in increased D max. and diminished fog.

The results in Table II show that increased density is obtained under certain of the filters as a result of the TABLE II (PART 1)—ACTIVITY OF VARIOUS LEUCO COMPOUNDS PLUS VARIOUS DYE SENSITIZERS IN CBr₄/MBT FORMULA

| Formula No. | Leuco Compound | Mg. | Dye Sensitizer | Mg. | Activator mg. CBr₄ | Activator mg. 2-MBT | Wet Coating Thickness (inch) | Binder | Substrate | Exposure Minutes Photoflood |
|---|---|---|---|---|---|---|---|---|---|---|
| 1 | Leuco Crystal Violet | 100 | | | 700 | 25 | 0.0015 | PS | 300-D | 1 |
| 2 | do | 100 | 3,6-bis(dimethylamino)-9-p-dimethylaminophenyl xanthylium bromide. | 1.0 | 700 | 25 | 0.0015 | PS | 300-D | 1 |
| 3 | 3,6-bis(dimethylamino)-9-p-dimethylaminophenyl-xanthene. | 100 | | | 700 | 25 | 0.0015 | PS | 300-D | 1 |
| 4 | As in 3 above | 100 | 1',3-diethyl-thia-2-cyanine Iodide. | 1.0 | 700 | 25 | 0.0015 | PS | 300-D | 1 |
| 5 | do | 100 | 3,3'-diethyl-4'-methyl-oxathiazolo-carbocyanine Iodide. | 0.1 | 700 | 25 | 0.0015 | PS | 300-D | 1 |
| 6 | do | 100 | 1',3-diethyl-thia-4'-carbocyanine Iodide. | 1.0 | 700 | 25 | 0.0015 | PS | 300-D | 1 |
| 7 | do | 100 | 3,3'-diethyl-thiacarbocyanine Iodide. | 0.1 | 700 | 25 | 0.0015 | PS | 300-D | 1 |
| 8 | 2,7-bis(dimethylamino)-10-p-dimethylaminophenyl-9,9-dimethyl-9,10-dihydro-anthracene. | 100 | | | 700 | 25 | 0.003 | CAB | 300-T | 1 |
| 9 | As in 8 above | 100 | 1',3-diethyl-thia-2'-cyanine Iodide. | 1.0 | 700 | 25 | 0.003 | CAB | 302-T | 1 |
| 10 | do | 100 | 3,6-bis(dimethylamino)-9-p-dimethylamino-xanthylium bromide. | 0.1 | 700 | 25 | 0.003 | CAB | 302-T | 1 |
| 11 | As in 3 above | 100 | 1,1'-dimethyl-2,2'-dicarbocyanine-p-toluene-sulfonate. | 1.0 | 700 | 25 | 0.0015 | PS | 300-D | 1 |
| 12 | do | 100 | 4-[(1-methyl-4(1H)-quinolylidene)-butenylidene]-3-methyl-1-phenyl-2-pyrazolin-5-one. | 1.0 | 700 | 25 | 0.0015 | PS | 300-D | 1 |
| 13 | As in 8 above | 100 | 2-[(3-ethyl-2(3H)-benzoxazolylidene)-ethylidene]-1,3-indanedione. | 1.0 | 700 | 25 | 0.0015 | PS | 300-D | 1 |
| 14 | do | 100 | | | 700 | 25 | 0.0015 | PS | 300-D | 1 |
| 15 | As in 3 above | 100 | 4-(p-dimethylaminostyryl) quinoline metho-p-toluene-sulfonate. | 0.5 | 700 | 25 | 0.0015 | PS | 300-D | 1 |
| 16 | do | 100 | 4-[4-(p-dimethylaminophenyl)-1,3-butadienyl]-quinoline metho-p-toluene-sulfonate. | 0.5 | 700 | 25 | 0.0015 | PS | 300-D | 1 |

TABLE II—PART 2—ACTIVITY OF VARIOUS LEUCO COMPOUNDS PLUS VARIOUS DYE SENSITIZERS IN CBr₄/MBT FORMULA

| Formula No. | Base plus Fog | Clear | | | Red | | | Green | | | Blue | | | Image Hue |
|---|---|---|---|---|---|---|---|---|---|---|---|---|---|---|
| | | No. Steps | Gross | Net | No. Steps | Gross | Net | No. Steps | Gross | Net | No. Steps | Gross | Net | |
| 1 | 0.05 | 13 | 1.00 | 0.95 | 6 | 0.85 | 0.80 | 5 | 0.24 | 0.19 | 8 | 0.25 | 0.20 | Blue. |
| 2 | 0.14 | 18 | 1.21 | 1.07 | 8 | 0.81 | 0.67 | 9 | 0.57 | 0.43 | 7 | 0.30 | 0.16 | Do. |
| 3 | 0.26 | 21 | 3+ | 2.74 | 18 | 2.81 | 2.55 | 21 | 2.36 | 2.10 | 17 | 2.20 | 1.94 | Magenta. |
| 4 | 0.15 | 21 | 2.93 | 2.78 | 15 | 2.55 | 2.40 | 21 | 1.89 | 1.74 | 18 | 2.35 | 2.20 | Do. |
| 5 | 0.20 | 21 | 2.94 | 2.74 | 18 | 3+ | 2.80 | 21 | 2.43 | 2.22 | 18 | 2.05 | 1.80 | Do. |
| 6 | 0.21 | 21 | 2.71 | 2.50 | 21 | 2.80 | 2.59 | 21 | 2.08 | 1.87 | 16 | 1.71 | 1.50 | Do. |
| 7 | 0.20 | 21 | 3+ | 2.80 | 21 | 3+ | 2.80 | 21 | 2.29 | 2.09 | 20 | 2.35 | 2.15 | Do. |
| 8 | 0.10 | 21 | 1.80 | 1.70 | 13 | 0.71 | 0.61 | 9 | 0.34 | 0.24 | 11 | 0.30 | 0.20 | Blue. |
| 9 | 0.19 | 21 | 2.65 | 2.46 | 13 | 0.96 | 0.77 | 16 | 0.98 | 0.79 | 13 | 0.53 | 0.34 | Do. |
| 10 | 0.14 | 21 | 2.63 | 2.48 | 14 | 0.86 | 0.72 | 11 | 0.79 | 0.65 | 12 | 0.51 | 0.37 | Do. |
| 11 | 0.21 | 21 | 3+ | 2.79 | 21 | 3.00 | 2.79 | 21 | 2.50 | 2.29 | 20 | 2.24 | 2.03 | Magenta. |
| 12 | 0.16 | 21 | 2.56 | 2.40 | 21 | 2.80 | 2.64 | 21 | 2.10 | 1.94 | 21 | 2.24 | 2.08 | Do. |
| 13 | 0.05 | 19 | 1.56 | 1.51 | 13 | 1.42 | 1.37 | 11 | 1.26 | 1.15 | 13 | 1.01 | 0.96 | Blue. |
| 14 | 0.06 | 18 | 1.55 | 1.49 | 12 | 1.25 | 1.19 | 9 | 1.27 | 1.21 | 12 | 0.66 | 0.60 | Do. |
| 15 | 0.24 | 21 | 2.88 | 2.67 | 21 | 2.45 | 2.24 | 21 | 2.25 | 2.01 | 21 | 2.70 | 2.46 | Magenta. |
| 16 | 0.18 | 21 | 2.91 | 2.73 | 21 | 2.42 | 2.14 | 21 | 1.87 | 1.69 | 21 | 2.70 | 2.52 | Do. | addition of appropriately colored sensitizing dyes, the added dye contributing sensitivity in the area of the spectrum in which it absorbs.

The anthracene containing compositions herein disclosed are claimed in a copending application Serial No. 395,903 filed Sept. 11, 1964.

Having described the invention in accordance with the patent statutes it is not intended that it be limited except as required by the appended claims.

We claim:

1. A composition which prints out a visible image directly as a result of exposure to visible light said composition being an intimate mixture consisting essentially of
   (1) at least one leuco compound selected from the group consisting of leuco compounds represented by one of the following general formulas

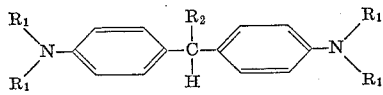

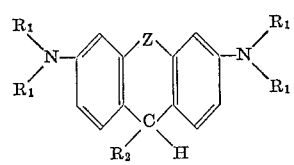

and

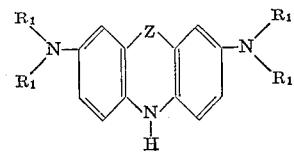

wherein each $R_1$ is selected from the group consisting of H, lower alkyl and aryl and not all of the $R_1$'s need be the same; $R_2$ is selected from the group consisting of H, lower alkyl and aryl; and Z represents a member selected from the group consisting of $>A$, $>S$, $>Se$, and $>NH$; and (2) an activator for said leuco compound consisting essentially of
   (a) at least one organic halogen compound represented by the general formula A—C—$X_3$ wherein A represents a member of the group selected from alkyl, aryl, aroyl, aralkyl, H, haloalkyl, Cl and Br and each X is Cl or Br; and
   (b) at least one colorless non-toxic sulfur compound selected from the group consisting of
      (1) mercapto compounds represented by the formula R—SH wherein R is a heterocyclic nucleus of the type commonly used in cyanine dye chemistry;
      (2) disulfides represented by the formula R—S—S—R wherein R has the same meaning as in 1 above;
      (3) disulfides of the general formula

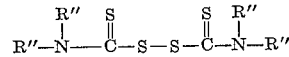

wherein R" is selected from the group consisting of H, lower alkyl and aryl;
      (4) cyclic sulfur compounds wherein the sulfur is attached to a carbon atom in a heterocyclic ring wherein the same carbon atom is attached to two non-carbon atoms;
      (5) thiourea and substituted thioureas; and
      (6) acyclic thioacetanilides said activators being present in the relative proportions of between 1.0 and 100 parts by weight of organic halogen compound per part by weight of leuco compound and between 0.1 and 10 parts by weight of sulfur compound per part by weight of leuco compound.

2. The composition of claim 1 wherein the leuco compound is a leuco base of a triphenylmethane dye.

3. The composition of claim 1 wherein the sulfur containing compound is a heterocyclic compound in which a mercapto group is attached to the number 2 carbon atom in the heterocyclic nucleus.

4. The composition of claim 3 wherein the sulfur containing compound is 2-mercaptobenzothiazole.

5. The composition of claim 1 wherein the leuco compound consists of 3,6-bis(dimethylamino)-9-(p-dimethylaminophenyl) xanthene.

6. A dry film consisting of the composition of claim 1 dispersed in a thin layer on an inert support.

7. The film of claim 6 wherein the support is a film forming plastic.

8. The film of claim 6 wherein the support is transparent.

9. The process of producing a direct print-out image from originally colorless compounds which comprises preparing the composition of claim 1 in the form of a thin layer, exposing said layer to a pattern of visible light whereby a visible image prints out directly as a result of said exposure.

References Cited

UNITED STATES PATENTS 3,285,744   11/1966   Sprague et al. _____ 96—90

NORMAN G. TORCHIN, *Primary Examiner.*

C. E. DAVIS, *Assistant Examiner.*

UNITED STATES PATENT OFFICE
CERTIFICATE OF CORRECTION

Patent No. 3,342,602                        September 19, 1967

Robert H. Sprague et al.

It is hereby certified that error appears in the above numbered patent requiring correction and that the said Letters Patent should read as corrected below.

Column 4, line 7, for "consist" read -- consists --; columns 5 and 6, TABLE II, part 2, in the heading, for "$CRr_4$" read -- $CBr_4$ --; column 7, line 42, for "A" read -- O --.

Signed and sealed this 8th day of October 1968.

(SEAL)
Attest:

Edward M. Fletcher, Jr.                     EDWARD J. BRENNER
Attesting Officer                             Commissioner of Patents